United States Patent [19]

Kimura et al.

[11] Patent Number: 5,535,358
[45] Date of Patent: Jul. 9, 1996

[54] CACHE MEMORY CONTROL CIRCUIT AND METHOD FOR CONTROLLING READING AND WRITING REQUESTS

[75] Inventors: Kozo Kimura; Tokuzo Kiyohara, both of Osaka, Japan

[73] Assignee: Matsushita Electric Industrial Co., Ltd., Osaka, Japan

[21] Appl. No.: 364,277

[22] Filed: Dec. 27, 1994

[30] Foreign Application Priority Data

Dec. 27, 1993 [JP] Japan .................................. 5-333864

[51] Int. Cl.⁶ ........................... G06F 12/00; G06F 12/02; G06F 13/00
[52] U.S. Cl. ........................ 395/445; 395/460; 395/467; 395/483; 395/494; 395/495
[58] Field of Search ..................................... 395/445, 451, 395/460, 467, 468, 471, 472, 483, 494, 496, 495, 375

[56] References Cited

U.S. PATENT DOCUMENTS

| | | | |
|---|---|---|---|
| 4,363,095 | 12/1982 | Woods et al. ........................... | 395/416 |
| 4,991,090 | 2/1991 | Emma et al. ........................ | 395/185.03 |
| 5,163,142 | 11/1992 | Mageau ................................. | 395/469 |
| 5,163,143 | 11/1992 | Culley et al. ........................... | 395/472 |
| 5,179,679 | 1/1993 | Shoemaker ............................... | 395/445 |
| 5,185,871 | 2/1993 | Frey et al. ................................ | 395/375 |
| 5,197,146 | 3/1993 | Lafetra ..................................... | 395/472 |
| 5,210,849 | 5/1993 | Takahashi et al. ....................... | 395/471 |
| 5,222,223 | 6/1993 | Webb, Jr. et al. ....................... | 395/467 |
| 5,297,269 | 3/1994 | Donaldson et al. ..................... | 395/472 |
| 5,301,290 | 4/1994 | Tetzlaff et al. .......................... | 395/472 |
| 5,363,495 | 11/1995 | Fry et al. ................................. | 395/375 |
| 5,404,482 | 4/1995 | Stamm et al. ........................... | 395/472 |
| 5,404,486 | 4/1995 | Frank et al. ............................. | 395/455 |

*Primary Examiner*—Tod R. Swann
*Assistant Examiner*—Tuan V. Thai
*Attorney, Agent, or Firm*—Rossi & Associates

[57] ABSTRACT

In cases where a remarked unit of tag addresses set in effective or access state is not registered in a tag section when a reading request is input, an external access is performed, and the remarked unit of tag addresses and other units of tag addresses respectively set in the access state are prepared in a tag entry preparing unit. In cases where a writing request is input to write a piece of updated word data in a remarked unit of data addresses corresponding to the remarked unit of tag addresses before the external access is finished, the state of the remarked tag entry prepared is changed to the effective state, and the updated word data is written in the remarked unit of data addresses of a data storing unit. Because the remarked unit of tag addresses is set in the effective state, the updated word data written in the remarked unit of data addresses is not replaced with a piece of external word data obtained according to the external access when the external access is finished. In cases where any writing request is not input until the external access is finished, the external word data is written in the remarked unit of data addresses, and the state of the remarked unit of tag addresses is changed to the effective state to replace the external word data with a piece of updated word data relating to a following writing request. Therefore, the writing and reading requests can be performed without delaying the writing request.

11 Claims, 4 Drawing Sheets

FIG. 3A

DATA ENTRY 1

A UNIT OF FOUR DATA ADDRESS

| WORD DATA 1 | DATA ADDRESS 1 |
| | DATA ADDRESS 2 |
| | DATA ADDRESS 3 |
| | DATA ADDRESS 4 |
| WORD DATA 2 | DATA ADDRESS 5 |
| | DATA ADDRESS 6 |
| | DATA ADDRESS 7 |
| | DATA ADDRESS 8 |
| WORD DATA 3 | DATA ADDRESS 9 |
| | DATA ADDRESS 10 |
| | DATA ADDRESS 11 |
| | DATA ADDRESS 12 |
| WORD DATA 4 | DATA ADDRESS 13 |
| | DATA ADDRESS 14 |
| | DATA ADDRESS 15 |
| | DATA ADDRESS 16 |

FIG. 3B

TAG ENTRY 1

A UNIT OF TAG ADDRESS

| ENTRY STATE 1 | TAG ADDRESS 1 |
| | TAG ADDRESS 2 |
| | TAG ADDRESS 3 |
| | TAG ADDRESS 4 |
| ENTRY STATE 2 | TAG ADDRESS 5 |
| | TAG ADDRESS 6 |
| | TAG ADDRESS 7 |
| | TAG ADDRESS 8 |
| ENTRY STATE 3 | TAG ADDRESS 9 |
| | TAG ADDRESS 10 |
| | TAG ADDRESS 11 |
| | TAG ADDRESS 12 |
| ENTRY STATE 4 | TAG ADDRESS 13 |
| | TAG ADDRESS 14 |
| | TAG ADDRESS 15 |
| | TAG ADDRESS 16 |

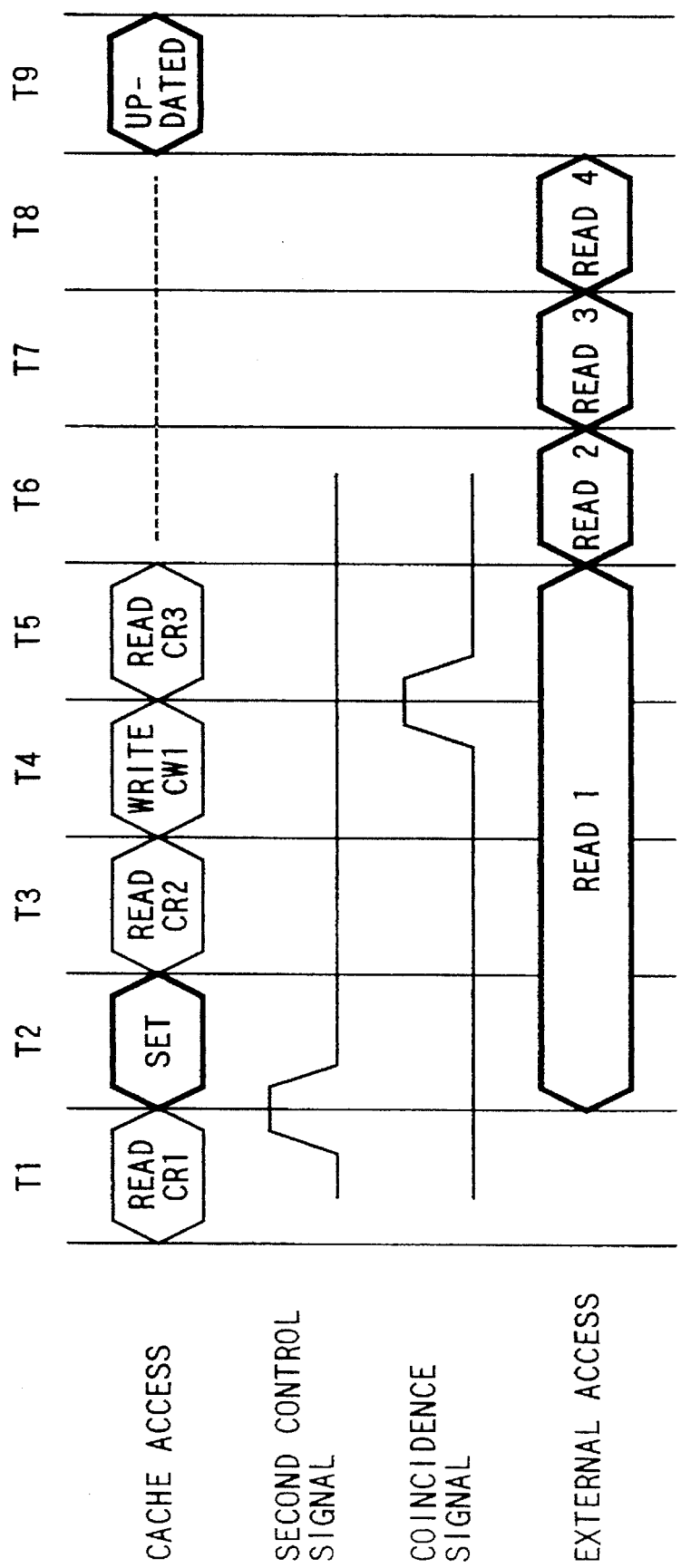

CACHE MEMORY CONTROL CIRCUIT AND METHOD FOR CONTROLLING READING AND WRITING REQUESTS

BACKGROUND OF THE INVENTION

1. Field of the Invention

The present invention relates to a cache memory control circuit and method in which a cache access is accepted to read or write a piece of cache data from/in a cache memory during an external access resulting from a cache miss-hit.

2. Description of the Prior Art

2.1. Previously Proposed Art

As an example of a conventional cache memory control circuit, a cache bypass buffer which is, for example, disclosed in detail in "Computer System Engineering" Oct. 14, 1988 (pp. 97–98) written by S. Tomira and K. Murakami and published by Syoukoudo has been known.

FIG. 1 is a flow chart showing an example of an operation performed in the conventional cache memory control circuit.

In cases where a cache address in which a piece of cache data to be read out or written is stored does not exist in a cache memory, a miss-hit occurs when the cache memory is accessed to read out or write a piece of cache data from/in the cache address of the cache memory. As shown in FIG. 1, when a miss-hit occurs at a first clock T1 in a reading cache access because a cache address in which a piece of cache data to be read out is stored does not exist in a cache memory, an external access is performed to read a piece of external data stored in a corresponding address of an external memory such as another cache memory or an external main memory. After the external access is successfully finished at a fifth clock T5, a next reading cache access is performed at a sixth clock T6. Therefore, a next cache access is undesirably delayed until an external access relating to a miss-hit is finished.

To enhance the performance of the cache memory, it is required to accept the next cache access during the external access relating to the miss-hit. In cases where a reading operation is performed as a next cache access to read a piece of required data stored in a remarked address before an external access performed to obtain the required data from an external memory is finished, the required data cannot be read out from the remarked address in the next cache access. Therefore, it is necessary to delay the performance of the next cache access until the external access is finished. In contrast, in cases where a writing operation is performed as a next cache access, the writing operation can be fundamentally performed before the finish of an external access.

2.2. Problems to be Solved by the Invention

However, there is a probability that a piece of external data is written in a remarked address after the writing operation as the next cache access is performed to write a piece of updated data in the remarked address. Therefore, there is a drawback that a piece of updated data relating to the next cache access is replaced with a piece of previous data relating to the external data to destroy the updated data.

SUMMARY OF THE INVENTION

An object of the present invention is to provide, with due consideration to the drawbacks of such a conventional cache memory control circuit, a cache memory control circuit and method in which a next cache access is performed during the performance of an external access without destroy a piece of updated data relating to the next cache access to enhance the performance of a cache memory.

The object is achieved by the provision of a cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether an entry state registered in the tag means is set in the effective state or the invalid state, outputting an external access request to request an external access for the purpose of obtaining N pieces of external word data to be stored in a first remarked data entry of the data storing means corresponding to a first remarked tag entry of the tag means which is designated by a first input tag address relating to a reading request in cases where it is judged that an entry state of a first remarked unit of M tag addresses represented by the first input tag address is set in the invalid state, outputting a first hit signal in cases where it is judged that an entry state of the first remarked unit of M tag addresses represented by the first input tag address is set in the effective state, and outputting a second hit signal in cases where it is judged that an entry state of a second remarked unit of M tag addresses represented by a second input tag address relating to a writing request is set in the effective state;

tag entry preparing means for preparing the first remarked tag entry in which the first remarked unit of M tag addresses and other three remarked units of M tag addresses are respectively set in the access state in the tag means in cases where it is judged by the hit judging means that the entry state of the first remarked unit of M tag addresses represented by the first input tag address is set in the invalid state;

access state detecting means for detecting whether or not the second remarked unit of M tag addresses is set in the access state in cases where it is judged by the hit judging means that the entry state of the second remarked unit of M tag addresses is not set in the effective state, and detecting whether or not the first remarked unit of M tag addresses prepared by the tag entry preparing means is set in the access state in cases where the external access requested by the hit judging means is finished, the second remarked unit of M tag addresses being set in the access state in cases where the second remarked unit of M tag addresses agrees with the first remarked unit of M tag addresses or the other three remarked units of M tag addresses registered in the first remarked tag entry on condition that the external access requested by the hit judging means is not finished, and the first remarked unit of M tag addresses prepared by the tag entry preparing means being maintained in the access state in cases where the external access requested by the hit judging means is not finished;

tag writing-in control means for changing the entry state of the second remarked unit of M tag addresses from the access state to the effective state in cases where it is judged by the access state detecting means that the second remarked unit of M tag addresses is set in the access state, and changing the entry state of the first remarked unit of M tag addresses from the access state to the effective state in cases where it is judged by the access state detecting means that the first remarked unit of M tag addresses is set in the access state on condition that the external access requested by the hit judging means is finished;

data writing operation control means for writing the N external word data obtained according to the external access request of the hit judging means in the first remarked data entry of the data storing means in cases where it is detected by the access state detecting means that each of the remarked units of M tag addresses in the first remarked tag entry prepared by the tag entry preparing means is set in the access state, writing a piece of first updated word data in a second remarked unit of data addresses of the data storing means corresponding to the second remarked unit of M tag addresses in cases where the second hit signal output from the hit judging means is received, and writing a piece of second updated word data in a second remarked unit of M data addresses of the data storing means corresponding to the second remarked unit of M tag addresses in cases where it is judged by the access state detecting means that the second remarked unit of tag addresses is set in the access state; and data reading operation control means for reading one of the N external word data which is obtained according to the external access request of the hit judging means and is stored in a first remarked unit of M data addresses of the data storing means corresponding to the first remarked unit of M tag addresses in cases where the N external word data are written in the first remarked data entry of the data storing means by the data writing operation control means, and reading a piece of required word data stored in a first remarked unit of M data addresses of the data storing means corresponding to the first remarked unit of M tag addresses in cases where the first hit signal output from the hit judging means is received.

In the above configuration, a first input tag address relating to a reading request or a second input tag address relating to a writing request is input to the hit judging means, and an entry state of a first remarked unit of M tag addresses represented by the first input tag address or an entry state of a second remarked unit of M tag addresses represented by the second input tag address is judged in the hit judging means. In cases where the first remarked unit of M tag addresses is set in the invalid state, an external access request is output from the hit judging means to request an external access for the purpose of obtaining N pieces of external word data expected to be stored in a first remarked data entry of the data storing means corresponding to a first remarked tag entry of the tag means which is designated by the first input tag address, and the first remarked tag entry in which the first remarked unit of M tag addresses and other three remarked units of M tag addresses are respectively set in the access state is prepared in the tag means by the function of the tag entry preparing means. In cases where the first remarked unit of M tag addresses is set in the effective state, a first hit signal is output from the hit judging means to the data reading operation control means. In cases where the second remarked unit of M tag addresses is set in the effective state, a second hit signal is output from the hit judging means to the data writing operation control means.

In cases where the second remarked unit of M tag addresses represented by the second input tag address relating to the writing request differs from the first remarked unit of M tag addresses represented by the first input tag address relating to the reading request and the other three remarked units of M tag addresses or in cases where the writing request is not performed until the external access is finished, it is detected by the access state detecting means that the first remarked unit of M tag addresses and the other three remarked units of M tag addresses prepared by the tag entry preparing means are respectively set in the access state, and the N external word data obtained according to the external access request of the hit judging means are written in a first remarked data entry of the data storing means corresponding to the first remarked tag entry under the control of the data writing operation control means. Thereafter, one of the external word data is read out from the first remarked unit of M tag addresses in the first remarked data entry of the data storing means under the control of the data reading operation control means.

In contrast, in cases where the writing request is performed before the external access is finished on condition that the second remarked unit of M tag addresses agrees with the first remarked unit of M tag addresses or one of the other three remarked units of M tag addresses, it is judged by the access state detecting means that the second remarked unit of M tag addresses is set in the access state because the first remarked unit of M tag addresses or one of the other three remarked units of M tag addresses agreeing with the second remarked unit of M tag addresses is prepared by the tag entry preparing means. Therefore, the entry state of the second remarked unit of M tag addresses is changed from the access state to the effective state under the control of the tag writing-in control means, and a piece of updated word data is written in a second remarked unit of M data addresses of the data storing means corresponding to the second remarked unit of M tag addresses under the control of the data writing operation control means. Thereafter, even though the external access is finished, a piece of particular external word data obtained according to the external access request of the hit judging means is not written in the second remarked unit of M data addresses of the data storing means because the entry state of the second remarked unit of M tag addresses is changed to the effective state. That is, the particular external word data is abandoned.

Accordingly, in cases where the writing request is performed before the external access is finished on condition that the second remarked unit of M tag addresses agrees with the first remarked unit of M tag addresses or one of the other three remarked units of M tag addresses, because the updated word data written in the second remarked unit of M data addresses according to the writing request is updated, the particular external word data obtained according to the external access request is not updated, and the storage of the particular external word data in the second remarked data entry can be forbidden. Therefore, a next cache access is performed during the performance of an external access without destroy a piece of updated data relating to the next cache access to enhance the performance of a cache memory.

In addition, in cases where it is judged that the first remarked unit of M tag addresses represented by the first input tag address relating to the reading request is set in the effective state, a first hit signal is output from the hit judging means to the data reading operation control means, and a piece of required word data stored in a first remarked unit of M data addresses of the data storing means corresponding to the first remarked unit of M tag addresses is read out under the control of the data reading operation control means. Also, in cases where it is judged that the second remarked unit of M tag addresses represented by the second input tag address relating to the writing request is set in the effective state, a second hit signal is output from the hit judging means to the data writing operation control means, and a piece of updated word data is written in a second remarked unit of M data addresses of the data storing means corresponding to the second remarked unit of M tag addresses under the control of the data writing operation control means.

The object is also achieved by the provision of a method for controlling a writing operation of either a piece of updated word data relating to a writing request or a piece of external word data relating to an external access, comprising the steps of:

storing pieces of word data in each of a plurality of data entries in a data storing means, N pieces of word data being stored in each of the data entries, each of the word data being stored in M data addresses, and a set of M data addresses for a piece of word data functioning as an administrative unit;

registering a plurality of tag addresses in a plurality of tag entries of a tag means and registering a plurality of entry states respectively determined for a unit of M tag addresses in the tag means, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

inputting a first input tag address relating to a reading request to a hit judging means;

judging whether or not a remarked unit of M tag addresses which is represented by the first input tag address and is set in the effective state is registered in the tag means;

requesting an external access to obtain N pieces of external word data expected to be stored in a remarked tag entry of the data storing means corresponding to a first remarked tag entry of the tag means which is designated by the first input tag address in cases where an entry state of the remarked unit of M tag addresses set in the effective state is not registered in the tag means;

preparing the remarked unit of M tag addresses set in the access state and other units of M tag addresses in the tag means to prepare a remarked unit of M data addresses corresponding to the remarked unit of M tag addresses and other units of M data addresses corresponding to the other units of M tag addresses in the data storing means in cases where the remarked unit of M tag addresses set in the effective state is not registered in the tag means;

inputting a second input tag address relating to a writing request to the hit judging means, the remarked unit of M tag addresses being represented by the second input tag address;

changing the state of the remarked unit of M tag addresses set in the access state to the effective state in cases where the external access is finished before the second input tag address relating to the writing request is input;

writing the external data obtained according to the external access in the remarked unit of M data addresses of the data storing means in cases where the external access is finished before the second input tag address relating to the writing request is input;

detecting that the entry state of the remarked unit of M tag addresses is set in the access state in cases where the second input tag address relating to the writing request is input before the external access is finished;

changing the entry state of the remarked unit of M tag addresses set in the access state to the effective state to forbid a writing operation of the external word data obtained according to the external access in the remarked unit of M tag addresses in cases where the remarked unit of M tag addresses set in the access state is detected;

writing a piece of updated word data relating to the writing request in the remarked unit of M data addresses of the data storing means at the same time that the remarked unit of M tag addresses set in the access state is changed to the effective state, the updated word data written in the remarked unit of M data addresses being not replaced with the external word data;

reading out the updated word data stored in the remarked unit of M data addresses according to the reading request after the external access is finished in cases where the second input tag address relating to the writing request is input before the external access is finished; and reading out the external word data stored in the remarked unit of M data addresses according to the reading request after the external access is finished in cases where the external access is finished before the second input tag address relating to the writing request is input.

In the above steps, in cases where the second input tag address relating to the writing request is input before the external access is finished, because the updated word data is updated and the external word is not updated, the updated word data is written in the remarked unit of M data addresses without replacing the updated word data written in the remarked unit of M data addresses with the external word data obtained according to the external access. In contrast, in cases where the external access is finished before the second input tag address relating to the writing request is input, because the external word data is updated when the external access is finished, the external word data is written in the remarked unit of M data addresses. Thereafter, when the second input tag address relating to the writing request is input, the updated word data is written in the remarked unit of M data addresses to replace the external word data with the updated word data.

Accordingly, a piece of word data updated can be always written in the remarked unit of M data addresses. Also, in cases where the second input tag address relating to the writing request is input before the external access is finished, the writing request is promptly performed without delaying the writing request until the external access is finished.

The object is also achieved by the provision of a cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether or not a unit of M tag addresses set in the effective state is registered in the tag means, and outputting an external access request to request an external access in cases where it is judged that a first remarked unit of M tag addresses which is set in the effective state and is represented by a first input tag address relating to a first writing request for requesting to store a piece of first updated word data in a first remarked unit of M data addresses corresponding to the first remarked unit of tag addresses is not registered in the tag means;

tag entry preparing means for preparing a tag line, in which the first remarked unit of tag addresses and a second remarked unit of tag addresses respectively set in the access state are included, in the tag means to prepare a data line in which the first remarked unit of M data addresses and a second remarked unit of M data addresses corresponding to the second remarked unit of M tag addresses are registered in the data storing means in cases where it is judged by the hit judging means that the first remarked unit of M tag addresses set in the effective state is not registered in the tag means, a piece of external word data to be stored in the second remarked unit of M data addresses being searched according to the external access requested by the hit judging means;

access state detecting means for detecting whether or not the second remarked unit of M tag addresses prepared by the tag entry preparing means is set in the access state in cases where it is judged by the hit judging means that the second remarked unit of M tag addresses which is set in the effective state and is represented by a second input tag address relating to a second writing request for requesting to store a piece of second updated word data in the second remarked unit of M data addresses is not registered in the tag means, and detecting whether or not the second remarked unit of M tag addresses prepared by the tag entry preparing means is set in the access state in cases where the external access requested by the hit judging means is finished;

tag writing-in control means for changing the entry state of the first remarked unit of M tag addresses from the access state to the effective state in cases where the tag line is prepared by the tag entry preparing means, changing the entry state of the second remarked unit of M tag addresses from the access state to the effective state to forbid a writing operation of the external word data in the second remarked unit of M data addresses set in the effective state in cases where it is detected by the access state detecting means according to the second writing request that the second remarked unit of M tag addresses prepared by the tag entry preparing means is set in the access state, and changing the entry state of the second remarked unit of M tag addresses from the access state to the effective state in cases where it is detected by the access state detecting means that the second remarked unit of M tag addresses prepared by the tag entry preparing means is set in the access state on condition that the external access requested by the hit judging means is finished; and data writing operation control means for writing the first updated word data in the first remarked unit of M data addresses of the data line prepared by the tag entry preparing means, writing the second updated word data in the second remarked unit of M data addresses of the data line prepared by the tag entry preparing means in cases where it is detected by the access state detecting means according to the second writing request that the second remarked unit of M tag addresses prepared by the tag entry preparing means is set in the access state, and writing the external word data in the second remarked unit of M data addresses of the data line prepared by the tag entry preparing means in cases where it is detected by the access state detecting means that the second remarked unit of M tag addresses prepared by the tag entry preparing means is set in the access state on condition that the external access requested by the hit judging means is finished.

In the above configuration, a first input tag address relating to a first writing request for requesting to store a piece of first updated word data in a first remarked unit of M data addresses corresponding to a first remarked unit of M tag addresses is initially input to the hit judging means, and it is judged whether or not the first remarked unit of M tag addresses which is set in the effective state and is represented by the first input tag address is registered in the tag means. In cases where it is judged that the first remarked unit of M tag addresses set in the effective state is not registered in the tag means, an external access request is output to a central processing unit to request an external access. Also, a tag line in which the first remarked unit of M tag addresses and a second remarked unit of M tag addresses respectively set in the access state are included is prepared in the tag means by the tag entry preparing means to prepare a data line in which the first remarked unit of M data addresses and a second remarked unit of M data addresses corresponding to the second remarked tag are registered in the data storing means. Thereafter, the entry state of the first remarked unit of M tag addresses is changed from the access state to the effective state under the control of the tag writing-in control means, and the first updated word data is stored in the first remarked unit of M data addresses of the data line under the control of the data writing operation control means. In contrast, an external main memory is searched for a piece of external data expected to be stored in the second remarked unit of M data addresses of the data line according to the external access.

Thereafter, in cases where the external access for obtaining the external word data is finished before a second input tag address relating to a second writing request for requesting to store a piece of second updated word data in the second remarked unit of M data addresses is input to the hit judging means, it is detected by the access state detecting means that the second remarked unit of M tag addresses is set in the access state. Thereafter, the entry state of the second remarked unit of M tag addresses is changed from the access state to the effective state under the control of the tag writing-in control means, and the external word data is stored in the second remarked unit of M data addresses of the data line under the control of the data writing operation control means.

In contrast, the second input tag address relating to the second writing request is input to the hit judging means before the external access is finished, it is detected by the access state detecting means that the second remarked unit of M tag addresses is set in the access state. Thereafter, the entry state of the second remarked unit of M tag addresses is changed from the access state to the effective state under the control of the tag writing-in control means to forbid a writing operation of the external word data in the second remarked unit of M data addresses set in the effective state, and the second updated word data is stored in the second remarked unit of M data addresses of the data line under the control of the data writing operation control means.

Accordingly, even though a data filling method in which all of data entries placed in a data line are occupied by pieces of word data is adopted, the present invention can be applied.

Also, in cases where the second input tag address relating to the second writing request is input to the hit judging means before the external access is finished, because the second updated word data is stored in the second remarked unit of M data addresses and because a writing operation of the external word data in the second remarked unit of M data addresses set in the effective state is forbidden, the word data stored in the second remarked unit of M data addresses can be always updated.

The object is also achieved by the provision of a cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether an entry state registered in the tag means is set in the effective state or the invalid state, outputting an external access request to request an external access for the purpose of obtaining N pieces of external word data to be stored in a first remarked data entry of the data storing means corresponding to a first remarked tag entry of the tag means which is designated by a first input tag address relating to a reading request in cases where it is judged that an entry state of a first remarked unit of M tag addresses represented by the first input tag address is set in the invalid state, outputting a first hit signal in cases where it is judged that an entry state of the first remarked unit of M tag addresses represented by the first input tag address is set in the effective state, outputting a second hit signal in cases where it is judged that an entry state of a second remarked unit of M tag addresses represented by a second input tag address relating to a writing request is set in the effective state, and judging whether or not a bus monitoring unit of M tag addresses represented by a bus monitoring address input to the hit judging means is registered in the tag means, the bus monitoring address being input to the hit judging means in cases where the bus monitoring address passing through an external bus is monitored to detect the renewal of a piece of external data stored in a bus monitoring external region of an external main memory corresponding to the bus monitoring unit of M tag addresses;

tag entry preparing means for preparing the first remarked tag entry in which the first remarked unit of M tag addresses and other three remarked units of M tag addresses are respectively set in the access state in the tag means in cases where it is judged by the hit judging means that the entry state of the first remarked unit of M tag addresses represented by the first input tag address is set in the invalid state;

access state detecting means for detecting whether or not the second remarked unit of M tag addresses is set in the access state in cases where it is judged by the hit judging means that the entry state of the second remarked unit of M tag addresses is not set in the effective state, and detecting whether or not the first remarked unit of M tag addresses prepared by the tag entry preparing means is set in the access state in cases where the external access requested by the hit judging means is finished, the second remarked unit of M tag addresses being set in the access state in cases where the second remarked unit of M tag addresses agrees with the first remarked unit of M tag addresses or the other three remarked units of M tag addresses registered in the first remarked tag entry on condition that the external access requested by the hit judging means is not finished, and the first remarked unit of M tag addresses prepared by the tag entry preparing means being maintained in the access state in cases where the external access requested by the hit judging means is not finished;

tag writing-in control means for changing the entry state of the second remarked unit of M tag addresses from the access state to the effective state in cases where it is judged by the access state detecting means that the second remarked unit of M tag addresses is set in the access state, changing the entry state of the first remarked unit of M tag addresses from the access state to the effective state in cases where it is judged by the access state detecting means that the first remarked unit of M tag addresses is set in the access state on condition that the external access requested by the hit judging means is finished, and changing the entry state of the second remarked unit of M tag addresses changed to the effective state to the access state in cases where it is judged by the hit judging means that the bus monitoring unit of M tag addresses represented by the bus monitoring address input to the hit judging means is registered in the tag means on condition that the bus monitoring unit of M tag addresses agrees with the second remarked unit of M tag addresses registered in the tag means;

data writing operation control means for writing the external word data obtained according to the external access request of the hit judging means in the first remarked unit of M data addresses of the data storing means in cases where it is detected by the access state detecting means that the first remarked unit of M tag addresses prepared by the tag entry preparing means is set in the access state, writing a piece of first updated word data in a second remarked unit of M data addresses of the data storing means corresponding to the second remarked unit of M tag addresses in cases where the second hit signal output from the hit judging means is received, and writing a piece of second updated word data in a second remarked unit of M data addresses of the data storing means corresponding to the second remarked unit of M tag addresses in cases where it is judged by the access state detecting means that the second remarked tag entry is set in the access state, the external word data being written in the second remarked unit of M data addresses to replace the second updated word data written in the second remarked unit of M data addresses with the external word data in cases where the bus monitoring unit of M tag addresses, the first remarked unit of M tag addresses and the second remarked unit of M tag addresses agree with each other; and data reading operation control means for reading the external word data obtained according to the external access request of the hit judging means in cases where the external word data is written in the first remarked unit of M data addresses of the data storing means by the data writing operation control means, and reading a piece of required word data stored in a first remarked data entry of the data storing means corresponding to the first remarked unit of M tag addresses in cases where the first hit signal output from the hit judging means is received.

In the above configuration, in cases where a bus monitoring address passing through an external bus is monitored by the hit judging means, it is detected that a piece of external data stored in a bus monitoring external region of an external main memory corresponding to the bus monitoring address is renewed. Therefore, in cases where a bus monitoring unit of M tag addresses corresponding to the bus monitoring address input to the hit judging means agrees with the second remarked unit of M tag addresses registered in the tag means on condition that the first remarked unit of M tag addresses agrees with the second remarked unit of M tag addresses, even though a piece of second updated word data is written in a second remarked unit of M data addresses of the data storing means under the control of the data writing operation control means before the external access requested by the hit judging means is finished, the second updated word data is not updated, but a piece of external word data obtained according to the external access is updated. Therefore, the state of the second remarked unit of M tag addresses changed to the effective state is again changed to the access state under the control of tag writing-in control means to replace the second updated word data written in the second remarked unit of M data addresses with the external data. Thereafter, the external data is written in the second remarked unit of M data addresses under the control of the data writing operation control means.

Accordingly, even though the external data stored in a bus monitoring external region of an external main memory is renewed without renewing the second updated word data written in the second unit of M data addresses, the second updated word data written in the second unit of M data addresses can be reliably changed to the external word data after the external access is finished in cases where the first remarked unit of M tag addresses agrees with the second remarked unit of M tag addresses.

The object is also achieved by the provision of a cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether an entry state registered in the tag means is set in the effective state or the invalid state, outputting an external access request to request an external access for the purpose of obtaining N pieces of external word data to be stored in a first remarked data entry of the data storing means corresponding to a first remarked tag entry of the tag means which is designated by a first input tag address relating to a reading request in cases where it is judged that an entry state of a first remarked unit of M tag addresses represented by the first input tag address is set in the invalid state, outputting a first hit signal in cases where it is judged that an entry state of the first remarked unit of M tag addresses represented by the first input tag address is set in the effective state, outputting a second hit signal in cases where it is judged that an entry state of a second remarked unit of M tag addresses represented by a second input tag address relating to a writing request is set in the effective state, and judging whether or not a bus monitoring unit of M tag addresses represented by a bus monitoring address input to the hit judging means is registered in the tag means, the bus monitoring address being input to the hit judging means in cases where the bus monitoring address passing through an external bus is monitored to detect the renewal of a piece of external data stored in a bus monitoring external region of an external main memory corresponding to the bus monitoring unit of M tag addresses;

tag entry preparing means for preparing the first remarked tag entry in which the first remarked unit of M tag addresses and other three remarked units of M tag addresses are respectively set in the access state in the tag means in cases where it is judged by the hit judging means that the entry state of the first remarked unit of M tag addresses represented by the first input tag address is set in the invalid state;

access state detecting means for detecting whether or not the second remarked unit of M tag addresses is set in the access state in cases where it is judged by the hit judging means that the entry state of the second remarked unit of M tag addresses is not set in the effective state, and detecting whether or not the first remarked unit of M tag addresses prepared by the tag entry preparing means is set in the access state in cases where the external access requested by the hit judging means is finished, the second-remarked unit of M tag addresses being set in the access state in cases where the second remarked unit of M tag addresses agrees with the first remarked unit of M tag addresses or the other three remarked units of M tag addresses registered in the first remarked tag entry on condition that the external access requested by the hit judging means is not finished, and the first remarked unit of M tag addresses prepared by the tag entry preparing means being maintained in the access state in cases where the external access requested by the hit judging means is not finished;

tag writing-in control means for changing the entry state of the second remarked unit of M tag addresses from the access state to the effective state in cases where it is judged by the access state detecting means that the second remarked unit of M tag addresses is set in the access state on condition that it is judged by the input judging means that the bus monitoring unit of M tag addresses does not agree with the second remarked unit of M tag addresses, and changing the entry state of the first remarked unit of M tag addresses from the access state to the effective state in cases where it is judged by the access state detecting means that the first remarked unit of M tag addresses is set in the access state on condition that the external access requested by the hit judging means is finished;

data writing operation control means for writing the N external word data obtained according to the external access request of the hit judging means in the first remarked data entry of the data storing means in cases where it is detected by the access state detecting means that each of the remarked units of M tag addresses in the first remarked tag entry prepared by the tag entry preparing means is set in the access state, writing a piece of first updated word data in a second remarked unit of data addresses of the data storing means corresponding to the second remarked unit of M tag addresses in cases where the second hit signal output from the hit judging means is received, and writing a piece of second updated word data in a second remarked unit of M data addresses of the data storing means corresponding to the second remarked unit of M tag addresses in cases where it is judged by the access state detecting means that the second remarked unit of tag addresses is set in the access state; and data reading operation control means for reading one of the N external word data which is obtained according to the external access request of the hit judging means and is stored in a first remarked unit of M data addresses of the data storing means corresponding to the first remarked unit of M tag addresses in cases where the N external word data are written in the first remarked data entry of the data storing means by the data writing operation control means, and reading a piece of required word data stored in a first remarked unit of M data addresses of the data storing means corresponding to the first remarked unit of M tag addresses in cases where the first hit signal output from the hit judging means is received.

In the above configuration, in cases where a bus monitoring address passing through an external bus is monitored by the hit judging means, it is detected that a piece of external data stored in a bus monitoring external region of an external main memory corresponding to the bus monitoring address is renewed. Therefore, in cases where a bus monitoring unit of M tag addresses corresponding to the bus monitoring address input to the hit judging means agrees with the second remarked unit of M tag addresses registered in the tag means, the entry state of the second remarked unit of M tag addresses is maintained in the access state not to write the second updated word data in the second remarked data entry. Thereafter, in cases where the first remarked unit of M tag addresses, the second remarked unit of M tag addresses and the bus monitoring unit of M tag addresses agree with each other, the external word data obtained according to the external access is written in the second remarked data entry in which the second updated word data is not written.

Accordingly, even though the external data stored in a bus monitoring external region of an external main memory is renewed without renewing the second updated word data written in the second remarked unit of M data addresses, a piece of updated word data can be always written in the data storing unit.

BRIEF DESCRIPTION OF THE DRAWINGS

The objects, features and advantages of the present invention will be apparent from the following description taken in conjunction with the accompanying drawings, in which:

FIG. 3A shows the arrangement of a data entry, a plurality of data addresses and pieces of word data stored in a data storing unit shown in FIG. 2;

FIG. 3B shows the arrangement of a tag entry, a plurality of tag addresses and a plurality of entry states stored in a tag section shown in FIG. 2; and FIG. 4 is a flow chart showing a series of operations performed in the control circuit shown in FIG. 2 according to the first embodiment.

DESCRIPTION OF THE PREFERRED EMBODIMENTS

Preferred embodiments of a cache memory control circuit according to the present invention are described with reference to drawings.

Figure 1:
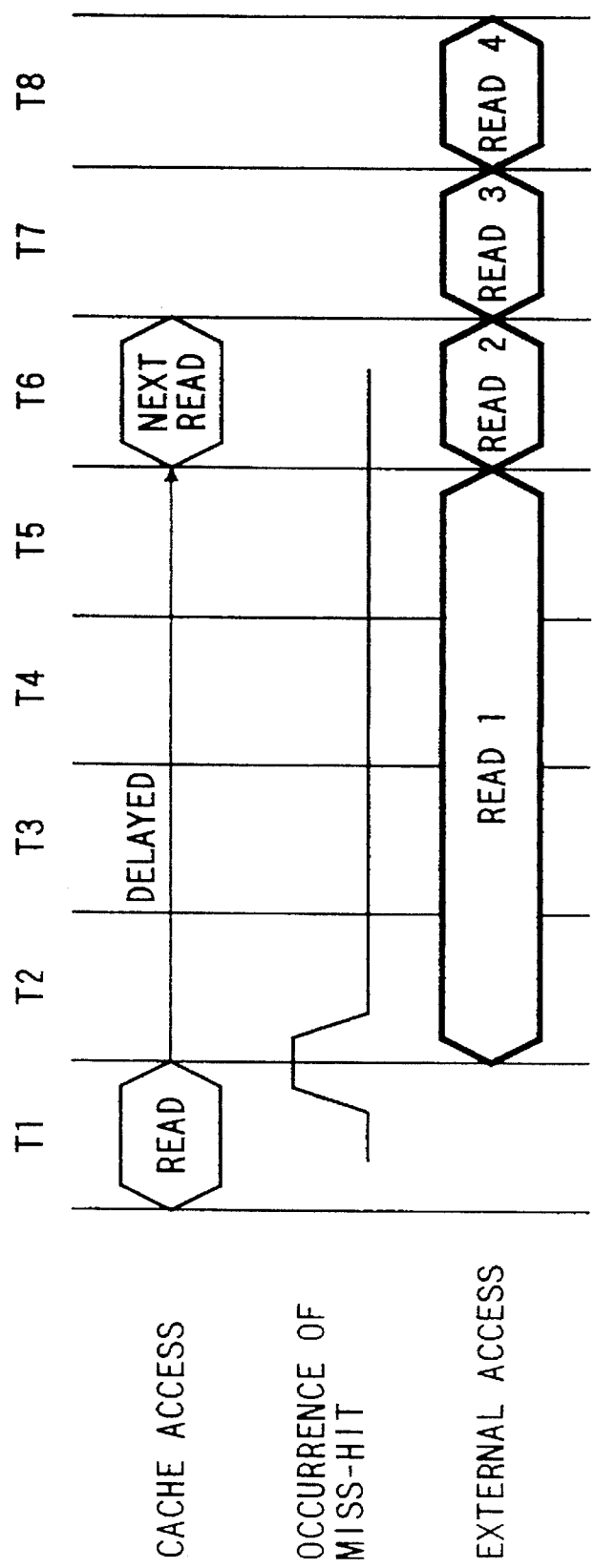
FIG. 1 is a flow chart showing an example of an operation performed in a conventional cache memory control circuit.
Figure 2:
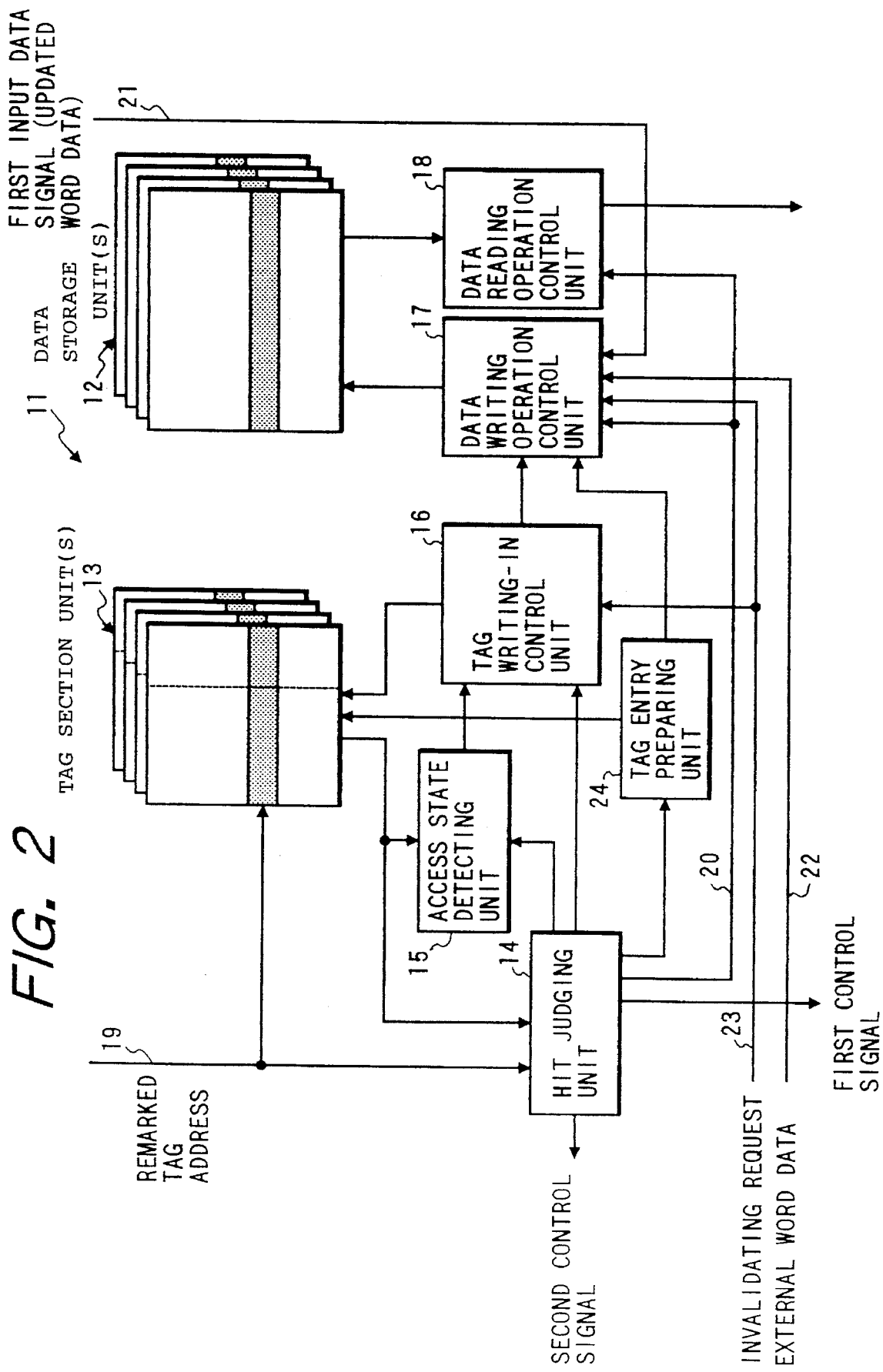
FIG. 2 is a constitutional block diagram of a cache memory control circuit according to a first embodiment of the present invention.

FIG. 2 is a constitutional block diagram of a cache memory control circuit according to a first embodiment of the present invention.

As shown in FIG. 2, a cache memory control circuit 11 comprises a data storing unit 12 for storing pieces of word data in each of a plurality of data entries, and a tag section 13 for registering a plurality of tag addresses in a plurality of tag entries and a plurality of entry states respectively determined for a unit of four tag addresses, an access state and an effective state. As shown in FIG. 3A, four (N=4) pieces of word data are stored in each of the data entries of the data storing unit 12, each of the word data is stored in four (M=4) data addresses, and a set of four data addresses for a piece of word data functions as an administrative unit. Also, as shown in FIG. 3B, sixteen (M×N=16) tag addresses are registered in each of the tag entries, and four (N=4) entry states are determined in each of the tag entries. The tag entries correspond to the data entries in one-to-one correspondence, and the tag addresses correspond to one of the data addresses in one-to-one correspondence. The entry states are classified into an effective state, an invalid state and an access state. The effective state set for a unit of four (M=4) tag addresses indicates that a piece of word data stored in four data addresses corresponding to the unit of four tag addresses is effective, the invalid state set for a unit of four (M=4) tag addresses indicates that a piece of word data stored in four data addresses corresponds to the unit of four tag addresses is invalid, and the access state for a unit of four (M=4) tag addresses indicates that an external access for searching for a piece of external word data expected to be stored in four data addresses corresponding to the unit of four tag addresses is under performance;

The cache memory control circuit 11 further comprises a hit judging unit 14 for judging whether or not a unit of four tag addresses represented by an input tag address is registered in the tag section 13, judging whether the unit of four tag addresses registered in the tag section 13 is set in the effective state, the access state or the invalid state, outputting a first control signal to a display unit in cases where the entry state of the unit of four tag addresses is set in the effective state or the access state, outputting a hit signal in cases where the entry state of the unit of four tag addresses is set in the effective state or the access state, outputting a second control signal to a central processing unit (not shown) to request an external access in cases where the unit of four tag addresses is not registered in the tag section 13 or the entry of the unit of four tag addresses is set in the invalid state, and outputting a miss-hit signal in cases where the unit of four tag addresses is not set in the effective state, a tag entry preparing unit 24 for preparing a tag entry designated by the input tag address in cases where the miss-hit signal output from the hit judging unit 14 is received and respectively setting entry states of units of four tag addresses registered in the tag entry in the access state, an access state detecting unit 15 for detecting whether or not an entry state of a unit of four tag addresses represented by the input address is set in the access state in cases where the miss-hit signal from the hit judging unit 14 is received or in cases where the external access requested by the hit judging unit 14 is finished, and outputting a coincidence signal in cases where the unit of four tag addresses represented by the input address is set to the access state, a tag writing-in control unit 16 for changing an entry state of the unit of four tag addresses represented by the input address from the access state to the effective state in cases where the coincidence signal output by the access state detecting unit 15 is received, and outputting a state changing signal in cases where the entry state of the the unit of four tag addresses is changed to the effective state;

a data writing operation control unit 17 for writing a piece of updated word data in a unit of four data addresses corresponding to the unit of four tag addresses in cases where the hit signal output from the hit judging unit 14 is received in a writing operation, and writing a piece of external word data obtained from an external main memory according to the external access in a unit of four data addresses corresponding to the unit of four tag addresses in cases where the external access is finished, and a data reading operation control unit 18 for reading out a piece of word data stored in a unit of four data addresses corresponding to the unit of four tag addresses in cases where the hit signal from the hit judging unit 14 is received in a reading operation, and outputting a first output data signal to the display unit.

In the above configuration, five types of fundamental operations are described.

In cases where a reading operation is performed to read out a piece of word data from the data storing unit 12, a remarked tag address is input to the tag section 13 through an input address line 19 to retrieve a remarked unit of four tag addresses of a remarked tag entry indicated by the remarked tag address, and a retrieving signal is transmitted from the tag section 13 to the hit judging unit 14. In the hit judging unit 14, it is judged whether or not the remarked unit of four tag addresses set in the effective state is registered in the tag section 13.

In cases where the remarked unit of four tag addresses is registered in the tag section 13 and the remarked unit of four tag addresses is set in the effective state during the reading operation (a first type of fundamental operation), it is judged in the hit judging unit 14 that a piece of required word data is effectively stored in a remarked unit of four data addresses of the data storing unit 12 corresponding to the remarked unit of four tag addresses of the tag section 13. Thereafter, a first control signal indicating that the required word data is effectively stored in the remarked unit of four data addresses is output from the hit judging unit 14 to a display unit (not shown), and a piece of first selecting information indicating a selecting instruction of the remarked unit of four data addresses is output as a hit signal from the hit judging unit 14 to the data reading operation control unit 18 through a control line 20. In the data reading operation control unit 18, the remarked unit of four data addresses of the data storing unit 12 is selected, the required word data stored in the remarked unit of four data addresses is read out from the data storing unit 12, and the required word data is output as a first output data signal to the display unit.

In contrast, in cases where the remarked unit of four tag addresses is not registered in the tag section 13 or the remarked unit of four tag addresses is not set in the effective state during the reading operation (a second type of fundamental operation), it is judged in the hit judging unit 14 that a piece of required word data is not effectively stored in a remarked unit-of four data addresses of the data storing unit 12 corresponding to the remarked unit of four tag addresses of the tag section 13. Thereafter, a second control signal is output from the hit judging unit 14 to a central processing unit (not shown) to perform an external access for the purpose of obtaining four pieces of external word data to be stored in a first remarked data entry of the data storing unit 12 corresponding to a first remarked tag entry of the tag section 12 which is designated by the remarked tag address. Also, a miss-hit signal is sent from the hit judging unit 14 to the tag entry preparing unit 24, and the first remarked tag entry corresponding to the first remarked data entry is prepared in the tag section 13 by the function of the tag entry preparing unit 24. Also, entry states of the remarked unit of four tag addresses and other three units of four tag addresses in the first remarked tag entry are respectively set in the access state because the external access is under performance to store the four external word data in the first remarked data entry. Thereafter, a following cache access is accepted in the cache memory control circuit 11.

In the first embodiment, the effective state set for a unit of four tag addresses is expressed by "11", the access state is expressed by "01", and the invalid state is expressed by "00".

In cases where a writing operation is performed to write a piece of updated word data in a remarked unit of four data addresses, a remarked tag address representing the remarked unit of four data addresses is input to the tag section 13 through the input address line 19 to retrieve a remarked unit of four tag addresses represented by the remarked tag address, and a retrieving signal is transmitted from the tag section 13 to the hit judging unit 14. In the hit judging unit 14, it is judged whether or not the remarked unit of four tag addresses set in the effective state is registered in the tag section 13.

In cases where the remarked unit of four tag addresses is registered in the tag section 13 and the remarked unit of four tag addresses is set in the effective state during the writing operation (a third type of fundamental operation), it is judged in the hit judging unit 14 that the remarked unit of four data addresses is ready for storing the updated word data. Thereafter, a piece of second selecting information indicating a selecting instruction of the remarked unit of four data addresses is output as a hit signal from the hit judging unit 14 to the data writing operation control unit 17 through the control line 20. Thereafter, the remarked unit of four data addresses of the data storing unit 12 is selected by the data writing operation control unit 17, and the updated word data is written in the remarked unit of four data addresses of the data storing unit 12 through an input data line 21 as a first input data signal.

In contrast, in cases where the remarked unit of four tag addresses is registered in the tag section 13 and the remarked unit of four tag addresses is set in the access state during the writing operation (a fourth type of fundamental operation), it is judged by the hit judging unit 14 that the writing operation is performed during an external access which is performed to obtain a piece of previous word data expected to be stored in the remarked unit of four data addresses. Thereafter, an external access informing signal is sent from the hit judging unit 14 to the tag writing-in control unit 16, and a piece of third selecting information indicating a selecting instruction of the remarked unit of four data addresses is output from the hit judging unit 14 to the data writing operation control unit 17 through the control line 20. In the control unit 16, the state of the remarked unit of four tag addresses is changed from the access state to the effective state not to replace the updated word data first stored in the remarked unit of four data addresses of the data storing unit 12 with the previous word data obtained according to the external access. In the data writing operation control unit 17, the remarked unit of four data addresses of the data storing unit 12 is selected, and the updated word data is written in the remarked unit of four data addresses of the data storing unit 12 through the input data line 21 as a first input data signal.

In cases where the four external word data obtained from the external main memory are written in the data storing unit 12 after the external access for obtaining the four external word data in the second type of fundamental operation is finished (a fifth type of fundamental operation), a piece of writing information indicating a successful finish of an external access is transmitted from the central processing unit of the control circuit 11 to the access state detecting unit 15 through the hit judging unit 14, and it is checked by the access state detecting unit 15 whether or not the remarked unit of four tag addresses represented by the remarked tag address input to the tag section 13 through the input address line 19 in the second type of operation is set in the access state. In cases where the remarked unit of four tag addresses is set in the access state, it is realized in the central processing unit of the control circuit 11 that a remarked unit of four data addresses of the data storing unit 12 corresponding to the remarked unit of four tag addresses is ready for storing the external word data obtained from the external main memory as a result of the external access. Therefore, a coincidence signal indicating a state changing instruction of the remarked unit of four tag addresses is sent from the access state detecting unit 15 to the tag writing-in control unit 16, and the entry state of the remarked unit of four tag addresses is changed from the access state to the effective state by the tag writing-in control unit 16. Thereafter, a state changing signal indicating the change of the state of the remarked unit of four tag addresses is sent from the control unit 16 to the data writing operation control unit 17. Therefore, the four external word data obtained from the external main memory are sent to the data writing operation control unit 17 through an external data line 22 and are written in the remarked unit of four data addresses of the data storing unit 12 corresponding to the remarked unit of four tag addresses by the function of the control unit 17.

Next, a series of operations performed in the control circuit 11 is described as an example with reference to FIG. 4.

FIG. 4 is a flow chart showing a series of operations performed in the control circuit 11 according to the first embodiment.

As shown in FIG. 4, when a first reading operation CR1 for reading four pieces of word data from four remarked units of data addresses such as a first remarked unit of data addresses ranging from 128-th to 131-th addresses, a second remarked unit of data addresses ranging from 132-th to 135-th addresses, a third remarked unit of data addresses ranging from 136-th to 139-th addresses and a fourth remarked unit of data addresses ranging from 140-th to 143-th addresses from the data storing unit 12 is performed at a first clock T1, the occurrence of a miss-hit is judged by the hit judging unit 14 because a first remarked tag entry corresponding to a first remarked data entry in which the four remarked units of data addresses are registered is not registered in the tag section 13 or because entry states of four remarked units of tag addresses in the first remarked tag entry are respectively set in the invalid state. Therefore, the second control signal is output to the central processing unit to obtain four pieces of external word data (called a piece of first external word data, a piece of second external word data, a piece of third external word data and a piece of fourth external word data) stored in the data addresses represented by the 128-th address, the 132-th address, the 136-th address and the 140-th address of the external main memory.

Thereafter, an external access is started according to the second control signal at a second clock T2, and a miss-hit signal is sent from the hit judging unit 14 to the tag entry preparing unit 24. Therefore, the first remarked tag entry corresponding to the first remarked data entry is prepared in the tag section 13 by the function of the tag entry preparing unit 24, and entry states of the four remarked unit of four tag addresses are respectively set in the access state. Therefore, a following cache access can be accepted.

Thereafter, a second reading operation CR2 for reading one or more pieces of word data from one or more units of four data addresses from the data storing unit 12 is performed at a third clock T3. In this case, because entry states of one or more units of four tag addresses corresponding to the units of four data addresses are respectively set in the effective state, the occurrence of a hit is judged by the hit judging unit 14, and the word data are successfully read out from the data storing unit 12 by the function of the data reading operation control unit 18.

Thereafter, a first writing operation CW1 for writing a piece of updated word data in the second remarked unit of four data addresses of the data storing unit 12 is performed at a fourth clock T4. In this case, because the external access is under performance, an access information indicating that the external access is under performance is sent from the central processing unit to the access state detecting unit 15 through the hit judging unit 14, and it is checked by the access state detecting unit 15 whether or not a second remarked unit of four tag addresses corresponding to the second remarked unit of four data addresses is set in the access state. Because the second remarked unit of four tag addresses is set in the access state, it is realized in the central processing unit that the second remarked unit of four data addresses of the data storing unit 12 is ready for storing a piece of second external word data obtained from the external main memory as a piece of previous word data because the first writing operation CW1 is performed after the first reading operation CR1 relating to the external access is performed. Therefore, a coincidence signal indicating a state changing instruction of the second remarked unit of four tag addresses is sent from the access state detecting unit 15 to the tag writing-in control unit 16, and the entry state of the second remarked unit of four tag addresses is changed from the access state to the effective state by the tag writing-in control unit 16 to write the updated word data in place of the second external word data. Thereafter, the updated word data is sent to the data writing operation control unit 17 and is written in the second remarked unit of four data addresses of the data storing unit 12. That is, the updated word data is stored in the second remarked unit of four data addresses represented by the 132-th address of the data storing unit 12. Therefore, a following cache access for reading out the updated word data stored in the second remarked unit of four data addresses of the data storing unit 12 can be accepted.

Thereafter, a third reading operation CR3 for reading one or more pieces of word data from one or more units of four data addresses from the data storing unit 12 is performed at a fifth clock T5. In this case, because one or more units of four tag addresses corresponding to the units of four data addresses are set in the effective state, the occurrence of a hit is judged by the hit judging unit 14, and the word data are successfully read out from the data storing unit 12 by the function of the data reading operation control unit 18.

Also, the second external word data is read out from the external main memory at the fifth clock T5, the second external word data is read out from the external main memory at a sixth clock T6, the third external word data is read out from the external main memory at a seventh clock T7, and the fourth external word data is read out from the external main memory at an eighth clock T8. Therefore, the external access is finished at the eighth clock T8.

Thereafter, the four external word data read out are tried to be written in the four remarked units of four data addresses of the data storing unit 12 by the function of the data writing operation control unit 17 at a ninth clock T9. In detail, a piece of writing information indicating a successful finish of the external access is transmitted from the central processing unit of the control circuit 11 to the access state detecting unit 15, and it is checked by the access state detecting unit 15 whether or not entry states of the four remarked units of four tag addresses are respectively set in the access state. Because the first, third and fourth remarked units of four tag addresses are respectively set in the access state, a coincidence signal indicating a state changing instruction of the first, third and fourth remarked units of four tag addresses is sent from the access state detecting unit 15 to the tag writing-in control unit 16, and the entry states of the first, third and fourth remarked units of four tag addresses are changed from the access state to the effective state by the tag writing-in control unit 16. Thereafter, a state changing signal indicating the change of the entry states of the first, third and fourth remarked units of four tag addresses is sent from the control unit 16 to the data writing operation control unit 17. Therefore, the first, third and fourth external word data obtained from the external main memory are sent to the data writing operation control unit 17 through the external data line 22 and are written in the first, third and fourth remarked units of four data addresses of the data storing unit 12 according to the state changing signal by the function of the control unit 17.

In contrast, because the second remarked unit of four tag addresses is set in the effective state, it is realized that the updated word data is stored in the second remarked unit of four data addresses of the data storing unit 12. Therefore, a state change forbidding signal is sent from the access state detecting unit 15 to the control unit 16. In the control unit 16, any operation for changing the entry state of the second remarked unit of four tag addresses is not performed, and a data replacement forbidding signal is sent from the control unit 16 to the control unit 17. Therefore, when the second external word data obtained from the external main memory is sent to the control unit 17, the second external word data is abandoned according to the data replacement forbidding signal without replacing the updated word data with the second external word.

Accordingly, in cases where a writing operation for writing a piece of updated word data in a remarked unit of four data addresses of the data storing unit 12 is instructed during the performance of an external access for storing a piece of external word data in the same remarked unit of four data addresses corresponding to a remarked unit of four tag addresses, because the entry state of the remarked unit of four tag addresses which is prepared and set in the access state is changed to the effective state and because the updated word data is written .in the remarked unit of four data addresses corresponding to the remarked unit of four tag addresses set in the effective region, the updated word data written in the remarked data entry is not replaced with the external word data after the external access is finished because the remarked unit of four tag addresses corresponding to the remarked unit of four data addresses is set in the effective region which indicates that the updated word data is stored in the remarked unit of four data addresses. That is, in cases where a piece of updated word data is written in a remarked unit of four data addresses according to a writing operation performed after a reading operation in which an external access is required, even though a piece of external word data expected to be written in the same remarked unit of four data addresses is read out from an external main memory in the external access after the updated word data is written in the remarked unit of four data addresses, the external word data is abandoned without replacing the updated word data with the external word data because the external word data relating to the reading operation performed before the writing operation is not updated.

Also, even though a plurality of external word data expected to be written in a plurality of remarked units of four data addresses are read out from an external main memory according to an external access of a reading operation, in cases where a piece of updated word data is written in a particular remarked unit of four data addresses selected from among the remarked units of four data addresses, in which a piece of particular external word data selected from among the external word data is expected to be stored, according to a writing operation performed after the reading operation, the updated word data written in the particular remarked unit of four data addresses is not replaced with the particular external word data after the external access is finished. In contrast, remaining pieces of external word data not including the particular external word data are written in remaining remarked units of four data addresses not including the particular remarked unit of four data addresses after the external access because remaining remarked units of four tag addresses corresponding to the remaining remarked units of four data addresses are set in the access state.

Next, a case that pieces of byte data respectively stored in a single address are processed in the cache memory control circuit 11 is described.

In cases where a piece of byte data is tried to be written in the 132-th data address of the data storing unit 12 in the first writing operation CW1 performed at the fourth clock T4, because each of the units of four data addresses functions as an administrative unit for a piece of word data and each of the units of four tag addresses functions as an administrative unit for an entry state, the byte data is not stored in the data storing unit 12 but stored in the 132-th data address of an external main memory or a lower level cache memory as a piece of updated byte data. Also, because a piece of word data stored in a remarked unit of four data addresses represented by the 132-th data address is not updated, a remarked unit of four tag addresses represented by the 132-th tag address of the tag section 13 corresponding to the 132-th data address of the data storing unit 12 is set in the invalid state.

Therefore, even though the second external word data is read out from the external main memory according to the external access started at the second clock T2 according to the first reading operation CR1, the second external word data is not written in the remarked unit of four data addresses of the data storing unit 12 because the remarked unit of four tag addresses corresponding to the remarked unit of four data addresses is set in the invalid state. Accordingly, the consistency in stored data between the external main memory and the data storing unit 12 can be maintained.

Also, in cases where a piece of byte data is tried to be written in the data storing unit 12 according to a writing operation, it is preferred that the writing operation for writing the byte data in a data address be delayed until the external access is finished.

Next, a case that an invalidating request for requesting the invalidation of a remarked unit of four tag addresses relating to an external access is sent from the central processing unit to the tag writing-in control unit 16 and the data writing operation control unit 17 through a requesting line 23 during the performance of the external access is described.

The invalidating request is produced in the central processing unit in cases where a piece of invalid word data is obtained in the external access as a piece of external word data because a bus error or the like occurs during the external access. In this case, the remarked unit of four tag addresses set in the access state is detected by the tag writing-in control unit 16 according to the invalidating request, and the entry state of the remarked unit of four tag addresses is changed to the invalid state during the performance of the external access. Therefore, after the external access is finished at the eighth clock T8, a piece of external word data obtained in the external access is not written in a remarked unit of four data addresses corresponding to the remarked unit of four tag addresses at the ninth clock T9 by the function of the data writing operation control unit 17.

Also, in cases where the invalidating request is sent to the cache memory control circuit 11 when the external access is finished, the state of the remarked unit of four tag addresses is changed to the invalid state in the same manner, and a piece of external word data obtained in the external access is not written in a remarked unit of four data addresses corresponding to the remarked unit of four tag addresses at the ninth clock T9.

Accordingly, even though a bus error or the like occurs during the external access, the storage of a piece of invalid word data in the data storing unit 12 can be forbidden. Also, even though a piece of data relating to an input/output control which is improper to be store in the data storing unit 12 is obtained in the external access as a piece of external word data, the storage of the improper data in the data storing unit 12 can be forbidden because the invalidating request is sent to the cache memory control circuit 11. Therefore, the performance of the cache memory control circuit 11 can be enhanced.

Also, even though the cache memory control circuit 11 is controlled to write one or more piece of particular word data in both the external main memory and the data storing unit 12 according to a write-through method, when an invalidating request for requesting the invalidation of one or more remarked units of four tag addresses corresponding to one or more remarked units of four data addresses in which the particular word data are expected to be stored is sent to the cache memory control circuit 11, the entry states of the remarked units of four tag addresses are respectively set in the invalid state, and the storage of the particular word data can be forbidden.

Next, another operation performed in the cache memory control circuit 11 is described according to a second embodiment of the present invention.

In cases where a remarked unit of four tag addresses corresponding to a remarked unit of four data addresses in which a piece of particular word data is expected to be stored according to a writing operation is not registered in the tag section 13 or in cases where the remarked unit of four tag addresses is set in the invalid state, a miss-hit occurs in the hit judging unit 14 when a remarked tag address representing the remarked unit of four tag addresses is input to the hit judging unit 14 according to a writing request, and a tag line (or a tag block) in which the remarked unit of four tag addresses is placed is newly prepared in the tag section 13 by the tag entry preparing unit 24 to newly prepare a data line (or a data block) which has a data area for storing four pieces of word data in the data storing unit 12. The particular word data is expected to be stored in the remarked unit of four data addresses placed in the data line newly prepared. In this case, a data filling method in which the particular word data and other three pieces of word data are stored in the data line and a data no-filling method in which the particular word data is only stored in the data line are well-known.

In detail, when the data line is newly prepared, the remarked unit of four tag addresses is set in the effective state to store the particular word data in the remarked unit of four data addresses, and other three units of four tag addresses corresponding to other three units of four data addresses placed in the data line are respectively maintained in the invalid state. Thereafter, in cases where the data filling method is adopted, a loading operation is started to change the states of the other three units of four tag addresses to the effective state under the control of the tag writing-in control unit 16, and other three pieces of word data are stored in the other units of four data addressed placed in the data line. In cases where the data no-filling method is adopted, the invalid state of the other three units of four tag addresses is maintained. In the second embodiment, the case that the data filling method is adopted is described.

In cases where a writing operation is performed to write a piece of updated word data in a remarked unit of four data addresses, a remarked tag address corresponding to the remarked unit of four data addresses is input to the tag section 13 through the input address line 19 to retrieve a remarked unit of four tag addresses represented by the remarked tag address registered in the tag section 13, and a retrieving signal is transmitted from the tag section 13 to the hit judging unit 14. In the hit judging unit 14, it is judged whether or not the remarked unit of four tag addresses set in the effective state is registered in the tag section 13.

In cases where the remarked unit of four tag addresses is registered in the tag section 13 and the remarked unit of four tag addresses is set in the effective state during the writing operation, it is judged in the hit judging unit 14 that the remarked unit of four data addresses is ready for storing the updated word data. Thereafter, a piece of selecting information indicating a selecting instruction of the remarked unit of four data addresses is output as a hit signal from the hit judging unit 14 to the data writing operation control unit 17 through the control line 20. Thereafter, the remarked unit of four data addresses of the data storing unit 12 is selected by the data writing operation control unit 17, and the updated word data is written in the remarked unit of four data addresses of the data storing unit 12 through the input data line 21 as a first input data signal.

In contrast, in cases where the remarked unit of four tag addresses is not registered in the tag section 13 or the remarked unit of four tag addresses is set in the invalid state during the writing operation, it is judged by the hit judging unit 14 that there is no unit of four data addresses to store the updated word data. That is, the occurrence of a miss-hit is declared by the hit judging unit 14. Therefore, a miss-hit signal is sent from the hit judging unit 14 to the tag writing-in control unit 16, and a tag line is prepared in the tag section 13 by the function of the preparing unit 24 to prepare the remarked unit of four tag addresses set in an effective region placed in the tag line. Also, other three units of four tag addresses are additionally prepared in the tag line, and the other three units of four tag addresses are respectively set in the access state by the function of the preparing unit 24. Thereafter, an entry preparing signal indicating the preparation of the remarked unit of four tag addresses is sent from the preparing unit 24 to the data writing operation control unit 17. Thereafter, the remarked unit of four data addresses of the data storing unit 12 is selected by the data writing operation control unit 17, and the updated word data is written in the remarked unit of four data addresses of the data storing unit 12 through the input data line 21 as a first input data signal. Also, a second control signal is sent from the hit judging unit 14 to the central processing unit to request an external access of the central processing unit. In the external access, three pieces of external word data expected to be stored in the other three unit of four data addresses placed in the data line are searched. Thereafter, a following cache access is accepted in the cache memory control circuit 11 in the same manner as in the first embodiment.

That is, in cases where a writing operation for writing a piece of particular word data in a particular unit of four data addresses selected from among the other three unit of four data addresses placed in the data line is performed before the external access is finished, the entry state of a particular unit of four tag addresses corresponding to the particular unit of four data addresses is changed from the access state to the effective state, and the particular word data is written in the particular unit of four data addresses. Thereafter, even though a piece of external word data expected to be stored in the particular unit of four data addresses is obtained in the external access, the external word is abandoned. In contrast, in cases where any writing operation for writing a piece of particular word data in one of the other three units of four data addresses placed in the data line is not performed before the external access is finished, the three external word data obtained in the external access are written in the other three units of four data addresses after the entry states of the other three units of four tag addresses are respectively changed to the effective state.

Accordingly, even though the data filling method is adopted, because the writing operation is performed during the external access without delaying the writing operation, following cache accesses can be smoothly performed. In other words, the following cache accesses are not blocked. Therefore, the performance of the cache memory control circuit 11 can be enhanced.

Next, another operation performed in the cache memory control circuit 11 is described according to a third embodiment of the present invention.

In the third embodiment, it is monitored by a bus monitoring system (or a snooping system) whether or not an address which is the same as that registered in the tag section 13 passes through an external bus. That is, an address passing though an external bus is monitored by the hit judging unit 14 through the input address line 19. In cases where a particular address which is the same as that registered in the tag section 13 is detected by the bus monitoring system, it is detected by the hit judging unit 14 that a piece of external data stored in external addresses of an external main memory represented by the particular address is renewed without renewing a piece of particular word data stored in a particular unit of four data addresses of the data storing unit 12 corresponding to a particular unit of four tag addresses represented by the particular address. In this case, because the particular word data stored in the remarked unit of four data addresses is not updated, an entry state of the remarked unit of four tag addresses of the tag section 13 is set in the invalid state. Therefore, the consistency in the stored data between the external main memory and the data storing unit 12 can be maintained.

In detail, as shown in FIG. 4, when the reading operation CR1 is performed at the first clock T1, the occurrence of the miss-hit is declared by the hit judging unit 14, and the external access is performed during a period ranging from the second clock T2 to the eighth clock T8. Also, the four remarked units of four tag addresses corresponding to the four remarked units of four data addresses are prepared in the tag section 13, and the four remarked units of four tag addresses are respectively set in the access state in the same manner as in the first embodiment. Thereafter, when the writing operation CW1 is performed, the entry state of the second remarked unit of four tag addresses is changed from the access state to the effective state.

Thereafter, in cases where a particular address representing the second remarked unit of four tag addresses registered in the tag section 13 is detected by the bus monitoring system, it is detected by the control circuit 11 that a piece of word data stored in the second remarked unit of four data addresses according to the writing operation CW1 is not updated and a piece of second external word data stored in an external unit of four data addresses corresponding to the particular address of the external main memory is updated. Therefore, the entry state of the second remarked unit of four tag addresses is changed from the effective state to the access state by the function of the tag writing-in control unit 16. Thereafter, when the external access is finished at the eighth clock T8, not only the first, third and fourth external word data obtained from the external main memory are written in the first, third and fourth remarked units of four data addresses of the data storing unit 12, but also the second external word data is written in the second remarked unit of four data addresses as a piece of updated word data by the function of the data writing operation control unit 17.

Also, after the miss-hit occurs in the first reading operation CR1, in cases where a particular address representing the second remarked unit of four tag addresses registered in the tag section 13 is detected by the bus monitoring system before the first writing operation CW1 is performed, the access state of the second remarked unit of four tag addresses is maintained by the function of the tag writing-in control unit 16 even though the first writing operation CW1 is performed. Thereafter, the second external word data obtained in the external access is written in the second remarked unit of four data addresses as a piece of updated word data by the function of the data writing operation control unit 17.

Accordingly, even though it is detected by the bus monitoring system that an address which is the same as that registered in the tag section 13 passes through the external bus, because the writing operation is performed during the external access without delaying the writing operation, following cache accesses can be smoothly performed. In other words, the following cache accesses are not blocked. Therefore, the performance of the cache memory control circuit 11 can be enhanced.

In the above embodiments, the tag section 13 and the data storing unit 12 are operated in synchronization with the same clock. However, it is applicable that the data storing unit 12 be operated after the tag section 13 to connect the tag section 13 and the data storing unit 12 in a pipe line function.

Also, the tag section 13 and the data storing unit 12 respectively have a single port. However, it is preferred that a multi-port be provided for a portion in which entry states in the tag section 13 are indicated. In this case, the operating time required to read out the entry states can be shortened.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether an entry state registered in the tag means is set in the effective state or the invalid state, outputting an external access request to request an external access for the purpose of obtaining N pieces of external word data to be stored in a first remarked data entry of the data storing means corresponding to a first remarked tag entry of the tag means which is designated by a first input tag address relating to a reading request in cases where it is judged that an entry state of a first remarked unit of M tag addresses represented by the first input tag address is set in the invalid state, outputting a first hit signal in cases where it is judged that an entry state of the first remarked unit of M tag addresses represented by the first input tag address is set in the effective state, and outputting a second hit signal in cases where it is judged that an entry state of a second remarked unit of M tag addresses represented by a second input tag address relating to a writing request is set in the effective state;

tag entry preparing means for preparing the first remarked tag entry in which the first remarked unit of M tag addresses and other three remarked units of M tag addresses are respectively set in the access state in the tag means in cases where it is judged by the hit judging means that the entry state of the first remarked unit of M tag addresses represented by the first input tag address is set in the invalid state;

access state detecting means for detecting whether or not the second remarked unit of M tag addresses is set in the access state in cases where it is judged by the hit judging means that the entry state of the second remarked unit of M tag addresses is not set in the effective state, and detecting whether or not the first remarked unit of M tag addresses prepared by the tag entry preparing means is set in the access state in cases where the external access requested by the hit judging means is finished, the second remarked unit of M tag addresses being set in the access state in cases where the second remarked unit of M tag addresses agrees with the first remarked unit of M tag addresses or the other three remarked units of M tag addresses registered in the first remarked tag entry on condition that the external access requested by the hit judging means is not finished, and the first remarked unit of M tag addresses prepared by the tag entry preparing means being maintained in the access state in cases where the external access requested by the hit judging means is not finished;

tag writing-in control means for changing the entry state of the second remarked unit of M tag addresses from the access state to the effective state in cases where it is judged by the access state detecting means that the second remarked unit of M tag addresses is set in the access state, and changing the entry state of the first remarked unit of M tag addresses from the access state to the effective state in cases where it is judged by the access state detecting means that the first remarked unit of M tag addresses is set in the access state on condition that the external access requested by the hit judging means is finished;

data writing operation control means for writing the N external word data obtained according to the external access request of the hit judging means in the first remarked data entry of the data storing means in cases where it is detected by the access state detecting means that each of the remarked units of M tag addresses in the first remarked tag entry prepared by the tag entry preparing means is set in the access state, writing a piece of first updated word data in a second remarked unit of data addresses of the data storing means corresponding to the second remarked unit of M tag addresses in cases where the second hit signal output from the hit judging means is received, and writing a piece of second updated word data in a second remarked unit of M data addresses of the data storing means corresponding to the second remarked unit of M tag addresses in cases where it is judged by the access state detecting means that the second remarked unit of tag addresses is set in the access state; and data reading operation control means for reading one of the N external word data which is obtained according to the external access request of the hit judging means and is stored in a first remarked unit of M data addresses of the data storing means corresponding to the first remarked unit of M tag addresses in cases where the N external word data are written in the first remarked data entry of the data storing means by the data writing operation control means, and reading a piece of required word data stored in a first remarked unit of M data addresses of the data storing means corresponding to the first remarked unit of M tag addresses in cases where the first hit signal output from the hit judging means is received.

2. A cache memory control circuit according to claim 1 in which the second remarked unit of M tag addresses is set in the invalid state under the control of the tag writing-in control means on condition that the second updated word data expected to be written in the second remarked unit of M data addresses of the data storing means under the control of the data writing operation control means has a size smaller than that of the second remarked unit of M data addresses functioning as the administrative unit in cases where it is judged by the access state detecting means that the second remarked unit of M tag addresses is set in the access state, and the second updated word data is not written in the second remarked unit of M data addresses corresponding to the second remarked unit of M tag addresses set in the invalid state under the control of the data writing operation control means.

3. A cache memory control circuit according to claim 1 in which a writing operation of the second updated word data in the second remarked unit of M data addresses of the data storing means is delayed until the external access requested by the hit judging means is finished on condition that the second updated word data has a size smaller than that of the second remarked unit of M data addresses functioning as the administrative unit in cases where it is judged by the access state detecting means that the second remarked unit of M tag addresses is set in the access state.

4. A cache memory control circuit according to claim 1 in which the first remarked unit of M tag addresses is set in the invalid state under the control of the tag writing-in control means in cases where an invalidating request for invalidating the entry state of the first remarked unit of M tag addresses is sent to the tag writing-in control means until the external access requested by the hit judging means is finished, and a piece of external word data obtained by the external access is not written in the first remarked unit of M data addresses corresponding to the first remarked unit of M tag addresses set in the invalid state.

5. A cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether or not a unit of M tag addresses set in the effective state is registered in the tag means, and outputting an external access request to request an external access in cases where it is judged that a first remarked unit of M tag addresses which is set in the effective state and is represented by a first input tag address relating to a first writing request for requesting to store a piece of first updated word data in a first remarked unit of M data addresses corresponding to the first remarked unit of tag addresses is not registered in the tag means;

tag entry preparing means for preparing a tag line, in which the first remarked unit of tag addresses and a second remarked unit of tag addresses respectively set in the access state are included, in the tag means to prepare a data line in which the first remarked unit of M data addresses and a second remarked unit of M data addresses corresponding to the second remarked unit of M tag addresses are registered in the data storing means in cases where it is judged by the hit judging means that the first remarked unit of M tag addresses set in the effective state is not registered in the tag means, a piece of external word data to be stored in the second remarked unit of data addresses being searched according to the external access requested by the hit judging means;

access state detecting means for detecting whether or not the second remarked unit of M tag addresses prepared by the tag entry preparing means is set in the access state in cases where it is judged by the hit judging means that the second remarked unit of M tag addresses which is set in the effective state and is represented by a second input tag address relating to a second writing request for requesting to store a piece of second updated word data in the second remarked unit of M data addresses is not registered in the tag means, and detecting whether or not the second remarked unit of M tag addresses prepared by the tag entry preparing means is set in the access state in cases where the external access requested by the hit judging means is finished;

tag writing-in control means for changing the entry state of the first remarked unit of M tag addresses from the access state to the effective state in cases where the tag line is prepared by the tag entry preparing means, changing the entry state of the second remarked unit of M tag addresses from the access state to the effective state to forbid a writing operation of the external word data in the second remarked unit of M data addresses set in the effective state in cases where it is detected by the access state detecting means according to the second writing request that the second remarked unit of M tag addresses prepared by the tag entry preparing means is set in the access state, and changing the entry state of the second remarked unit of M tag addresses from the access state to the effective state in cases where it is detected by the access state detecting means that the second remarked unit of M tag addresses prepared by the tag entry preparing means is set in the access state on condition that the external access requested by the hit judging means is finished; and data writing operation control means for writing the first updated word data in the first remarked unit of M data addresses of the data line prepared by the tag entry preparing means, writing the second updated word data in the second remarked unit of M data addresses of the data line prepared by the tag entry preparing means in cases where it is detected by the access state detecting means according to the second writing request that the second remarked unit of M tag addresses prepared by the tag entry preparing means is set in the access state, and writing the external word data in the second remarked unit of M data addresses of the data line prepared by the tag entry preparing means in cases where it is detected by the access state detecting means that the second remarked unit of M tag addresses prepared by the tag entry preparing means is set in the access state on condition that the external access requested by the hit judging means is finished.

6. A cache memory control circuit according to claim 5 in which the first remarked unit of M tag addresses is set in the invalid state under the control of the tag writing-in control means on condition that the first updated word data expected to be written in the first remarked unit of M data addresses of the data storing means under the control of the data writing operation control means has a size smaller than that of the first unit of M data addresses functioning as the administrative unit in cases where it is judged by the access state detecting means that the first remarked unit of M tag addresses is set in the access state, and the first updated word data is not written in the first remarked unit of M data addresses corresponding to the first remarked unit of M tag addresses set in the invalid state under the control of the data writing operation control means.

7. A cache memory control circuit according to claim 5 in which a writing operation of the second updated word data in the second remarked unit of M data addresses of the data storing means is delayed until the external access requested by the hit judging means is finished on condition that the second updated word data has a size smaller than that of the second unit of M data addresses functioning as the administrative unit in cases where it is judged by the access state detecting means that the second remarked unit of M tag addresses is set in the access state.

8. A cache memory control circuit according to claim 5 in which the second remarked unit of M tag addresses is set in the invalid state under the control of the tag writing-in control means in cases where an invalidating request for invalidating the second remarked unit of M tag addresses is sent to the tag writing-in control means until the external access requested by the hit judging means is finished, and the external word data obtained by the external access is not written in the second remarked unit of M data addresses corresponding to the second remarked unit of M tag addresses set in the invalid state.

9. A cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether an entry state registered in the tag means is set in the effective state or the invalid state, outputting an external access request to request an external access for the purpose of obtaining N pieces of external word data to be stored in a first remarked data entry of the data storing means corresponding to a first remarked tag entry of the tag means which is designated by a first input tag address relating to a reading request in cases where it is judged that an entry state of a first remarked unit of M tag addresses represented by the first input tag address is set in the invalid state, outputting a first hit signal in cases where it is judged that an entry state of the first remarked unit of M tag addresses represented by the first input tag address is set in the effective state, outputting a second hit signal in cases where it is judged that an entry state of a second remarked unit of M tag addresses represented by a second input tag address relating to a writing request is set in the effective state, and judging whether or not a bus monitoring unit of M tag addresses represented by a bus monitoring address input to the hit judging means is registered in the tag means, the bus monitoring address being input to the hit judging means in cases where the bus monitoring address passing through an external bus is monitored to detect the renewal of a piece of external data stored in a bus monitoring external region of an external main memory corresponding to the bus monitoring unit of M tag addresses;

tag entry preparing means for preparing the first remarked tag entry in which the first remarked unit of M tag addresses and other three remarked units of M tag addresses are respectively set in the access state in the tag means in cases where it is judged by the hit judging means that the entry state of the first remarked unit of M tag addresses represented by the first input tag address is set in the invalid state;

access state detecting means for detecting whether or not the second remarked unit of M tag addresses is set in the access state in cases where it is judged by the hit judging means that the entry state of the second remarked unit of M tag addresses is not set in the effective state, and detecting whether or not the first remarked unit of M tag addresses prepared by the tag entry preparing means is set in the access state in cases where the external access requested by the hit judging means is finished, the second remarked unit of M tag addresses being set in the access state in cases where the second remarked unit of M tag addresses agrees with the first remarked unit of M tag addresses or the other three remarked units of M tag addresses registered in the first remarked tag entry on condition that the external access requested by the hit judging means is not finished, and the first remarked unit of M tag addresses prepared by the tag entry preparing means being maintained in the access state in cases where the external access requested by the hit judging means is not finished;

tag writing-in control means for changing the entry state of the second remarked unit of M tag addresses from the access state to the effective state in cases where it is judged by the access state detecting means that the second remarked unit of M tag addresses is set in the access state, changing the entry state of the first remarked unit of M tag addresses from the access state to the effective state in cases where it is judged by the access state detecting means that the first remarked unit of M tag addresses is set in the access state on condition that the external access requested by the hit judging means is finished, and changing the entry state of the second remarked unit of M tag addresses changed to the effective state to the access state in cases where it is judged by the hit judging means that the bus monitoring unit of M tag addresses represented by the bus monitoring address input to the hit judging means is registered in the tag means on condition that the bus monitoring unit of M tag addresses agrees with the second remarked unit of M tag addresses registered in the tag means;

data writing operation control means for writing the external word data obtained according to the external access request of the hit judging means in the first remarked unit of M data addresses of the data storing means in cases where it is detected by the access state detecting means that the first remarked unit of M tag addresses prepared by the tag entry preparing means is set in the access state, writing a piece of first updated word data in a second remarked unit of M data addresses of the data storing means corresponding to the second remarked unit of M tag addresses in cases where the second hit signal output from the hit judging means is received, and writing a piece of second updated word data in a second remarked unit of M data addresses of the data storing means corresponding to the second remarked unit of M tag addresses in cases where it is judged by the access state detecting means that the second remarked tag entry is set in the access state, the external word data being written in the second remarked unit of M data addresses to replace the second updated word data written in the second remarked unit of M data addresses with the external word data in cases where the bus monitoring unit of M tag addresses, the first remarked unit of M tag addresses and the second remarked unit of M tag addresses agree with each other; and data reading operation control means for reading the external word data obtained according to the external access request of the hit judging means in cases where the external word data is written in the first remarked unit of M data addresses of the data storing means by the data writing operation control means, and reading a piece of required word data stored in a first remarked data entry of the data storing means corresponding to the first remarked unit of M tag addresses in cases where the first hit signal output from the hit judging means is received.

10. A cache memory control circuit, comprising:

data storing means for storing pieces of word data in each of a plurality of data entries, N pieces of word data being stored in each of the data entries, each of the word data being stored in M data addresses, and a set of M data addresses for a piece of word data functioning as an administrative unit;

tag means for registering a plurality of tag addresses in a plurality of tag entries and a plurality of entry states respectively determined for a unit of M tag addresses, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

hit judging means for judging whether an entry state registered in the tag means is set in the effective state or the invalid state, outputting an external access request to request an external access for the purpose of obtaining N pieces of external word data to be stored in a first remarked data entry of the data storing means corresponding to a first remarked tag entry of the tag means which is designated by a first input tag address relating to a reading request in cases where it is judged that an entry state of a first remarked unit of M tag addresses represented by the first input tag address is set in the invalid state, outputting a first hit signal in cases where it is judged that an entry state of the first remarked unit of M tag addresses represented by the first input tag address is set in the effective state, outputting a second hit signal in cases where it is judged that an entry state of a second remarked unit of M tag addresses represented by a second input tag address relating to a writing request is set in the effective state, and judging whether or not a bus monitoring unit of M tag addresses represented by a bus monitoring address input to the hit judging means is registered in the tag means, the bus monitoring address being input to the hit judging means in cases where the bus monitoring address passing through an external bus is monitored to detect the renewal of a piece of external data stored in a bus monitoring external region of an external main memory corresponding to the bus monitoring unit of M tag addresses;

tag entry preparing means for preparing the first remarked tag entry in which the first remarked unit of M tag addresses and other three remarked units of M tag addresses are respectively set in the access state in the tag means in cases where it is judged by the hit judging means that the entry state of the first remarked unit of M tag addresses represented by the first input tag address is set in the invalid state;

access state detecting means for detecting whether or not the second remarked unit of M tag addresses is set in the access state in cases where it is judged by the hit judging means that the entry state of the second remarked unit of M tag addresses is not set in the effective state, and detecting whether or not the first remarked unit of M tag addresses prepared by the tag entry preparing means is set in the access state in cases where the external access requested by the hit judging means is finished, the second remarked unit of M tag addresses being set in the access state in cases where the second remarked unit of M tag addresses agrees with the first remarked unit of M tag addresses or the other three remarked units of M tag addresses registered in the first remarked tag entry on condition that the external access requested by the hit judging means is not finished, and the first remarked unit of M tag addresses prepared by the tag entry preparing means being maintained in the access state in cases where the external access requested by the hit judging means is not finished;

tag writing-in control means for changing the entry state of the second remarked unit of M tag addresses from the access state to the effective state in cases where it is judged by the access state detecting means that the second remarked unit of M tag addresses is set in the access state on condition that it is judged by the input judging means that the bus monitoring unit of M tag addresses does not agree with the second remarked unit of M tag addresses, and changing the entry state of the first remarked unit of M tag addresses from the access state to the effective state in cases where it is judged by the access state detecting means that the first remarked unit of M tag addresses is set in the access state on condition that the external access requested by the hit judging means is finished;

data writing operation control means for writing the N external word data obtained according to the external access request of the hit judging means in the first remarked data entry of the data storing means in cases where it is detected by the access state detecting means that each of the remarked units of M tag addresses in the first remarked tag entry prepared by the tag entry preparing means is set in the access state, writing a piece of first updated word data in a second remarked unit of data addresses of the data storing means corresponding to the second remarked unit of M tag addresses in cases where the second hit signal output from the hit judging means is received, and writing a piece of second updated word data in a second remarked unit of M data addresses of the data storing means corresponding to the second remarked unit of M tag addresses in cases where it is judged by the access state detecting means that the second remarked unit of tag addresses is set in the access state; and data reading operation control means for reading one of the N external word data which is obtained according to the external access request of the hit judging means and is stored in a first remarked unit of M data addresses of the data storing means corresponding to the first remarked unit of M tag addresses in cases where the N external word data are written in the first remarked data entry of the data storing means by the data writing operation control means, and reading a piece of required word data stored in a first remarked unit of M data addresses of the data storing means corresponding to the first remarked unit of M tag addresses in cases where the first hit signal output from the hit judging means is received.

11. A method for controlling a writing operation of either a piece of updated word data relating to a writing request or a piece of external word data relating to an external access, comprising the steps of:

storing pieces of word data in each of a plurality of data entries in a data storing means, N pieces of word data being stored in each of the data entries, each of the word data being stored in M data addresses, and a set of M data addresses for a piece of word data functioning as an administrative unit;

registering a plurality of tag addresses in a plurality of tag entries of a tag means and registering a plurality of entry states respectively determined for a unit of M tag addresses in the tag means, M×N tag addresses being registered in each of the tag entries, N entry states being determined in each of the tag entries, the tag entries corresponding to the data entries in one-to-one correspondence, the tag addresses corresponding to one of the data addresses in one-to-one correspondence, the entry states being classified into an effective state, an invalid state and an access state, the effective state set for a unit of M tag addresses indicating that a piece of word data stored in M data addresses corresponding to the unit of M tag addresses is effective, the invalid state set for a unit of M tag addresses indicating that a piece of word data stored in M data addresses corresponding to the unit of M tag addresses is invalid, and the access state for a unit of M tag addresses indicating that an external access for searching for a piece of external word data expected to be stored in M data addresses corresponding to the unit of M tag addresses is under performance;

inputting a first input tag address relating to a reading request to a hit judging means;

judging whether or not a remarked unit of M tag addresses which is represented by the first input tag address and is set in the effective state is registered in the tag means;

requesting an external access to obtain N pieces of external word data expected to be stored in a remarked tag entry of the data storing means corresponding to a first remarked tag entry of the tag means which is designated by the first input tag address in cases where an entry state of the remarked unit of M tag addresses set in the effective state is not registered in the tag means;

preparing the remarked unit of M tag addresses set in the access state and other units of M tag addresses in the tag means to prepare a remarked unit of M data addresses corresponding to the remarked unit of M tag addresses and other units of M data addresses corresponding to the other units of M tag addresses in the data storing means in cases where the remarked unit of M tag addresses set in the effective state is not registered in the tag means;

inputting a second input tag address relating to a writing request to the hit judging means, the remarked unit of M tag addresses being represented by the second input tag address;

changing the state of the remarked unit of M tag addresses set in the access state to the effective state in cases where the external access is finished before the second input tag address relating to the writing request is input;

writing the external data obtained according to the external access in the remarked unit of M data addresses of the data storing means in cases where the external access is finished before the second input tag address relating to the writing request is input;

detecting that the entry state of the remarked unit of M tag addresses is set in the access state in cases where the second input tag address relating to the writing request is input before the external access is finished;

changing the entry state of the remarked unit of M tag addresses set in the access state to the effective state to forbid a writing operation of the external word data obtained according to the external access in the remarked unit of M tag addresses in cases where the remarked unit of M tag addresses set in the access state is detected;

writing a piece of updated word data relating to the writing request in the remarked unit of M data addresses of the data storing means at the same time that the remarked unit of M tag addresses set in the access state is changed to the effective state, the updated word data written in the remarked unit of M data addresses being not replaced with the external word data;

reading out the updated word data stored in the remarked unit of M data addresses according to the reading request after the external access is finished in cases where the second input tag address relating to the writing request is input before the external access is finished; and reading out the external word data stored in the remarked unit of M data addresses according to the reading request after the external access is finished in cases where the external access is finished before the second input tag address relating to the writing request is input.

* * * * *